United States Patent [19]

Van Beek

[11] Patent Number: 4,951,159
[45] Date of Patent: Aug. 21, 1990

[54] DIGITAL MODULATION TECHNIQUE

[75] Inventor: Gary Van Beek, North Gower, Canada

[73] Assignee: A.I.T. Corporation, Ontario, Canada

[21] Appl. No.: 418,640

[22] Filed: Oct. 10, 1989

[51] Int. Cl.$^5$ .............................................. H04N 1/40
[52] U.S. Cl. ...................................... 358/455; 358/458
[58] Field of Search .............. 358/455, 448, 458, 461, 358/163, 429, 456, 296

[56] References Cited

U.S. PATENT DOCUMENTS

| | | | |
|---|---|---|---|
| 4,533,958 | 8/1985 | Herget | 358/448 |
| 4,661,859 | 4/1987 | Mailloux et al. | 358/456 |
| 4,698,688 | 10/1987 | Ochi et al. | 358/456 |
| 4,802,105 | 1/1989 | Suzuki | 358/296 |
| 4,809,082 | 2/1989 | Yamaguchi et al. | 358/455 |
| 4,814,877 | 3/1989 | Nagashima | 358/163 |

Primary Examiner—Howard W. Britton
Assistant Examiner—Tommy D. Lee
Attorney, Agent, or Firm—Wenderoth, Lind & Ponack

[57] ABSTRACT

A digital pulse with modulator is described for use with a Raster-scanning print engine in which a grey scale having a high number of levels, typically at least 63, is described. This modulator reduces the amount of information requiring processing in the input multiple bit image signal by simulating one of the least significant bits as a delay applied to modulate the output print engine signal pulse width. With suitable speed components, a grey scale of at least about 255 levels can be provided.

11 Claims, 3 Drawing Sheets

DIGITAL MODULATION TECHNIQUE

In the past customarily there have been used two main methods for pictorial and the like electronic image generation in which a level of shading, a so-called "grey scale", exists in the printed image, be it either a monochrome one or a polychrome one. These are known as the dither method, a typical example of which is in U.S. Pat. No. 4,706,077, and the density pattern method, a typical example of which is in U.S. Pat. No. 4,758,043. These methods are known to have image quality problems, in terms of both image texture and image resolution, which may be attributed at least in part to the very limited number of grey scale levels possible with either of these methods. It is generally accepted that in order to obtain a good quality image which reproduces the tones of an original to a visually acceptable degree at least 16, and preferably more, grey scale levels are needed.

Many attempts have been made to provide laser printing systems which provide acceptable prints, typically black-and-white monochrome, in which a gray scale of at least 60 levels is utilized. Ohara, in U.S. Pat. No. 4,347,423 describes a system in which an input signal is sampled and converted to a digital number which is used to address a read-only memory in which is stored pulse numbers together with corresponding pulse width selection numbers. The outputs of the read-only memory are compared with the output of a counter circuit to determine the pulse width which is applied to a laser beam modulation circuit. A plurality of modulating pulses are produced, each having a different width. One of these is selected as the modulating signal in accordance with the selection bits stored in the read-only memory. As described, this is a complex system in which three delayed signals are always produced, only one of which is selected. Ohara does not mention in this patent how many grey scale levels it is intended to provide; as described the circuit appears to be capable of about 256.

Riseman, in U.S. Pat. No. 4,800,442 describes a system which seeks to provide a good quality image, using a conventional laser print engine. The Riseman method provides a 64 level gray scale; Riseman suggests that a 256-level scale is possible. In the embodiment described, Riseman utilizes a six bit-input and a 64 grey scale level output. This embodiment utilizes analog techniques, and thus requires a digital-to-analog converter, as well as analog pulse width modulation circuitry. These are believed to be more complex than is necessary. Further, Riseman uses a six bit input combined with four look-up tables to generate up to 256 grey scale levels. As this does not improve final image resolution, a simpler 8-bit oriented digital pulse width modulation system would be advantageous.

This invention seeks to overcome these shortcomings, and to provide a digital pulse width modulator based on a digital input signal, and which does not involve a digital-to-analog converter. Further, this invention seeks to provide a grey scale directly related to the number of bits in the digital input signal and which can provide a grey scale having at least 127 levels.

Accordingly, this invention seeks to provide a digital pulse with modulator suitable for use in a system controlling a laser print engine in which an output signal is generated from an input digital image signal wherein the output image signal includes a grey scale having at least 63 levels, and preferably at least 127 levels.

In this invention, the digital pulse width modulator functions to reduce the number of bits in the multiple bit input image signal requiring processing by separating from the input image signal at least one of the least significant bits in the input image signal; processing the remaining bits in the input image signal to provide an output signal corresponding to an acceptable number of grey scale levels; and simulating one of the separated bits by a delay signal which modifies the output signal pulse width in response to the value of the separated bit. In a preferred embodiment, the two least significant bits are separated, the most insignificant bit is discarded, and the value of the other bit is used to modify the output signal pulse width.

In a second embodiment of this invention the digital pulse width modulator comprises in combination:

(i) a means to receive a multiple bit input image signal from an image signal generating means;

(ii) a means to separate from the input image signal at least one bit including the most insignificant bit;

(iii) a signal generator means including a counter means controlling the width of the pulse generated by the signal generator in response to the value of the remainder of the input image signal after separation of the at least one bit;

(iv) a clock means controlling the counter means; and (v) a delay means which receives one of the separated bits from the input image signal and which extends the width of the pulse generated by the signal generator in response to the value of the second separated bit.

In a more specific detailed embodiment this invention seeks to provide in a third more detailed embodiment (i) a means to receive a multiple bit input image signal from an image signal generating means;

(ii) a means to separate and discard from the input image signal a first bit consisting of the most insignificant bit;

(iii) a means to separate from the input image signal a second bit consisting of the least significant bit in the remaining signal;

(iv) a signal generator means including a counter means controlling the width of the pulse generated by the signal generator in response to the value of the remainder of the input image signal after separation of the two bits;

(v) a clock means controlling the counter means; and (vi) a delay means which receives the first separated bit from the input image signal and which extends the length of the pulse generated by the signal generator in response to the value of the second separated bit.

In a fourth detailed embodiment this invention seeks to provide an apparatus for generating a printed image containing at least 63 grey scale levels comprising in combination:

(a) an image input signal generating means which provides a multiple bit input image signal comprising at least 8 bits and corresponding to an image to be printed;

(b) means to separate at least one least significant bit, and preferably two bits, from the input image signal and, preferably, means to discard the most insignificant separated bit;

(c) a clock means substantially synchronized with a print engine pixel clock means, wherein the frequency of the clock means is a whole number multiple of the frequency of the pixel clock means having a value of $2^n$, wherein n is the number of bits remaining in the image signal after at least one bit has been separated from it;

(d) a signal generating means including a counter means actuated by the clock means and which controls the width of the signal generator output pulse in response to the value of the remaining bits of the input image signal;

(e) a delay means receiving one of the separated bits in the image input signal which lengthens the signal generator output pulse in response to the value of the received separated bit to provide a pulse width modulated signal;

(f) means to apply the pulse width modulated signal to a Raster scanning print engine for generating a series of successive scan lines, to cause the print engine to generate each scan line as a succession of printed segments the size of each of which is determined by the pulse width of the pulse width modulated signal, thereby to provide a variable density printed image comprising a plurality of printed segments corresponding to an image including a grey scale having at least 63 levels.

Preferably, the multiple bit input image signal is an 8 bit signal of which the most insignificant bit is discarded, and the least significant bit of the remaining signal is separated and used by the delay means.

In this broad embodiment, the input image signal generating means comprises any system capable of providing an image to be printed in the required multiple bit form. Some possibilities are: (i) a video camera, either essentially alone, or connected to picture signal processing equipment such as a PC whereby the image may be modified and other data, such as alpha-numeric text, or other pictorial information may be added to it; (ii) a computer generated image; and (iii) an optical character or other scanner image Thus the image to the printed may contain any combination of pictures, pictorial matter, text either printed or written (i.e. a signature), machine readable data, and may be a monochrome or in colour. For a colour system, it is to be noted that more than one image signal is processed essentially simultaneously: usually 3 or 4 signals are used, depending upon the colour printing process. In that case, it is also possible to use multiplexing techniques in the circuit designs.

In a similar fashion there is considerable scope in the choice of the print engine to be used. It is only required that the main clock in the digital pulse width modulator have an appropriate frequency in relation to the number of bits processed in the input image signal and to the pixel clock for the printer.

The invention will now be discussed by way of reference to the drawings in which.

Figure 1:
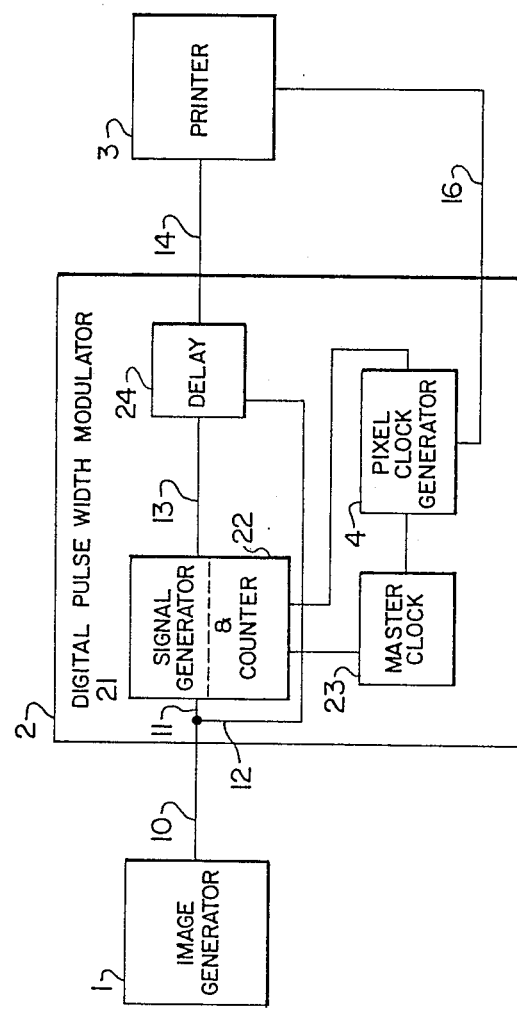
FIG. 1 represents a block schematic diagram of a print system using this invention.

FIG. 1 shows in schematic form the sort of image production system with which this invention is concerned. It comprises essentially three components: an image signal generation system 1, a digital pulse width modulation system 2, and a printer 3. An image signal 10 on reaching the digital pulse width modulation system is split into at least two parts. A major part comprising the significant bits, 11, provides the input signal for the signal for the signal generator 21. The output 13 of the signal generator, which comprises a pulse whose width is determined by the value of the input image 11 passes to the delay, 24. The output pulse signal 14 from the delay, 24, passes to the printer. Both the delay, 24, and the counter 22 are controlled by the master clock 23 and the pixel clock generator, 4 which also receives a synchronizing signal, 16, from the printer, 3, and, with which the pixel clock is synchronized. The delay 24 can be essentially in one of two states: "on" or "off": which state is adopted is determined by the value of the remaining bit of the input signal, 12. If the value is low, then the delay is not actuated and the pulse as generated by the signal generator-counter combination is passed forward to the printer. If the value is high, then the delay is activated, and a modified width pulse is passed forward to the printer.

Thus the nature of the signal sent to the printer is in part determined by the multiplicity of bits processed in the signal generator to provide an initial pulse, and by the value of the separated bit, which may result in the initial pulse being lengthened to simulate the bit excluded from initial processing.

Figure 2:
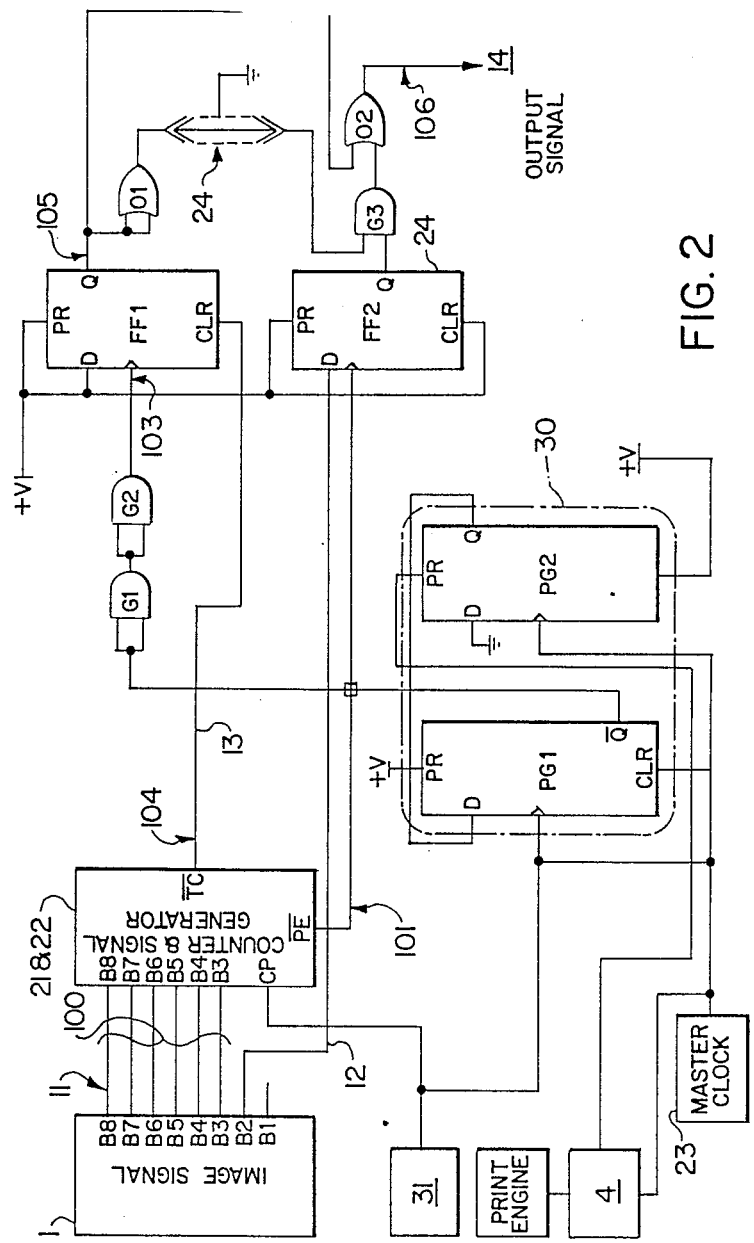
FIG. 2 represents a more detailed diagram of the pulse width modulation system.
Figure 3:
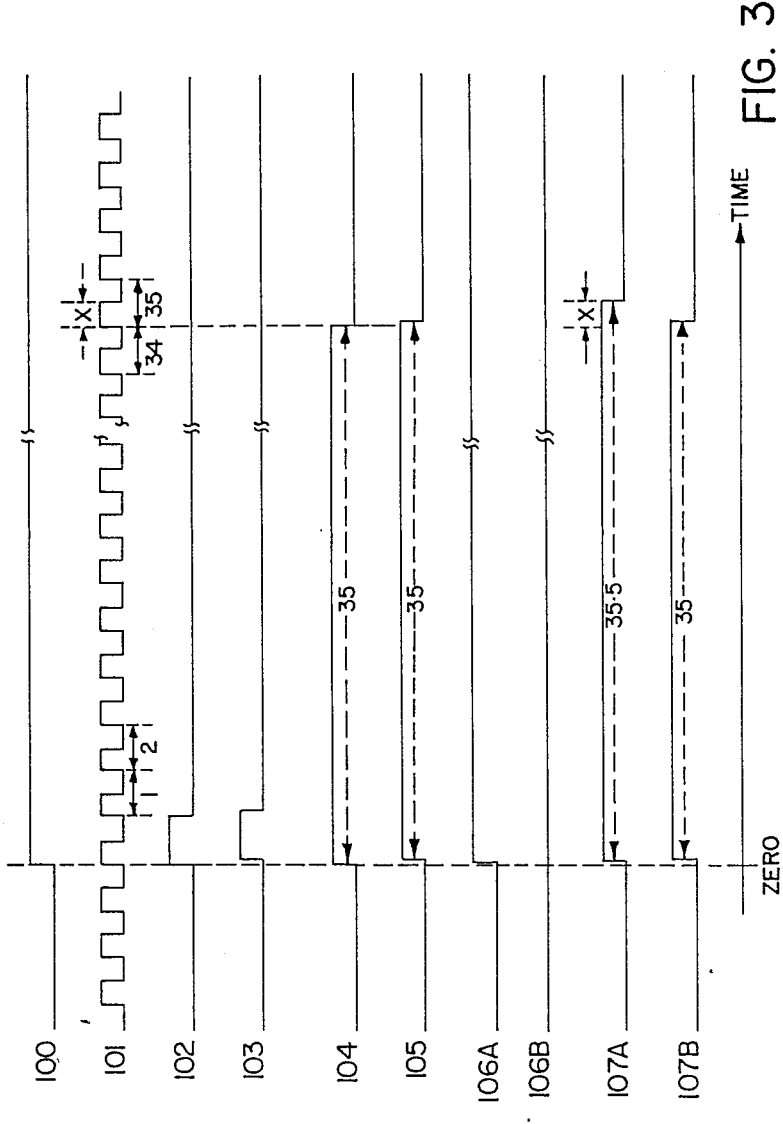
FIG. 3 represents typical wave form signals obtained at different points within the pulse width modulator during image generation.

A preferred embodiment of the invention is shown in the schematic diagram of FIG. 2, which will also be discussed in the context of FIG. 3, which shows typical signal wave forms to be expected at various points in the digital pulse width modulator of FIG. 2 as a given signal progresses through it. Certain parts of the system are shown only in outline in FIG. 2. In this figure, items are numbered, where relevant, to correspond to the numbers used in FIG. 1.

Initially, an 8-bit signal, identified as B1-B8, is present as the multibit image input signal. The most insignificant bit, B1, is separated from the input image signal and discarded. The next least insignificant bit, B2, is also separated from the input image signal and passes in line 12 to the flip/flop FF2, which is part of the delay circuit, the function of which will be discussed below. The remaining 6 bits of the input image signal are passed to the combined counter and signal generator 21 and 22. These 6 bits can be in any one of 64 states to provide an image signal: for the sake of description, it is assumed that these bits have a signal value of 35, at zero time which is represented by the change, in signal level in line 100 of FIG. 3.

The sequence to process this input image signal commences with a print information demand from the synchronized pixel clock generator, 4 to the narrow pulse generator, 30. This pulse generator which comprises two flip flops, PG1 and PG2, sends a single pulse from the master clock segments, shown at line 101 in FIG. 3, to this 21, as shown in line 102 in FIG. 3. At the same time a similar pulse passes to the two flip flops, FF1 and FF2, the latter of which is part of the delay system 24. In order to ensure proper counter operation, this signal is somewhat delayed by the two AND gates, G1 and G2, as is shown in line 103 of FIG. 3. On receipt of this pulse the data represented by bit B3 through B8 is loaded. The counter counts down to zero, from the loaded number, which has been taken to be 35, when it receives the 35th master clock pulse, at its clock input, following this load operation. This results in the signal generator providing an output pulse at line 13 having the shape shown at line 104 in FIG. 3, which is a pulse corresponding to 35 master clock pulses.

At the same time, the load signal after delay by G1 and G2 sets the flip flop FF1 to a high output condition and passes the signal in to the delay circuit, with the pulse wave form shown at line 105 in FIG. 3, through OR gate 01 and delay 24.

Also at the same time, the load signal activates the flip flop FF2 so that if the bit B2 represents a high value as shown at line 106A in FIG. 3, this flip flop allows the signal to arrive at the AND gate G3 and consequently activates the OR-gate 02, thus lengthening the pulse width, as shown in line 105 of FIG. 3, to the form shown in line 107A in FIG. 3. Alternatively, if the bit B2 represents a low value, as shown in line 106B of FIG. 3, no signal passes to the AND gate G3 and similarly no signal passes to the OR gate 02 from the AND gate G3. Consequently, the pulse leaving FF1 passes directly to OR gate 02, and corresponds to the form shown in line 107B of FIG. 3.

Thus whether, or not, the initially generated pulse corresponding to the value 35 established by bits B3 to B8 is used as the print signal as is or modified to the value 35.5 depends on the value of the bit B2. By this means, the 64 grey levels defined by bits 3 through 8 is nearly doubled to 127, without increasing the amount of data processed by the counter and signal generator units. Only 127 levels are obtained as a signal corresponding to 1 in the 64 levels cannot be modulated as this is a zero deviation output. This allows this circuit to process very fast signals using moderate speed electronic devices. The "delay" added to the original pulse width by this method will always extend the pulse width by a period corresponding to one half of the master clock interval, as shown at x in lines 101 and 107A of FIG. 3. This additional amount can be added to all of the states represented by B3 through B8 except the lowest, because a '1' value corresponds to all signals B3 through B8 being low, and hence to no pulse generated by the signal generator. Since B3 through B8 correspond to 64 levels, and incorporation of the half clock width delay into the pulse depending on the value of B2 to all but one of these levels provides 127 levels for the grey scale.

The controlling factor in the operation of this digital pulse width modulator appears to be the counter speed. It has to be able to count at least as fast as, and preferably somewhat faster than, the frequency of the master clock 23. In its turn, the frequency of the master clock is determined by that of the pixel clock, since the master clock frequency has to be $2^n$ times the pixel clock speed, where n is the number of bits in the input image signal being processed. Thus in the above example, as 6 bits are being processed, the ratio has to be 64. Provided that the counter is capable of doing so, there is no reason why B2 cannot be taken into the processing step, and B1 used as the signal bit passed to the delay circuit. However in that case the pixel clock: master clock speed ratio becomes $2^7$, or 128.

The above discussion also considers an 8-bit image input signal as that is the form of digital signal usually provided by imaging devices. Provided the pixel clock: master clock ratio is preserved and a counter of suitable speed is available there is no reason why the concepts of this invention cannot be applied to systems providing fewer, e.g. 6, or more, e.g. 10, bits.

It would also appear possible to combine the most insignificant bit B1 into the circuit shown schematically in FIG. 3 by way of an additional 'OR' gate. This is not recommended. In such a situation there would then be three possible states of B1 and B2 which would lead to the delay circuit lengthening the pulse, corresponding to either or both of B1 and B2 having a high value. It appears that such a situation impairs picture quality.

What is claimed is:

1. In a method for producing an output image signal to drive a raster print engine from an multiple bit image input signal by generating in a signal generator a pulse having a width corresponding to the input image signal, the improvement comprising processing the multiple bit image input signal in a digital pulse width modulator which functions to reduce the number of bits in the multiple bit image input signal by separating from the input image signal at least one of the least significant bits in the input image signal; processing the remaining bits in the input image signals to provide an output signal pulse corresponding to acceptable number of grey scale levels; and simulating one of the separated bits by a delay signal which modifies the output signal pulse width in response to the value of the separated bit.

2. A method according to claim 1 in which the two least significant bits are separated, the most insignificant bit is discarded, and the value of the other separated bit is used to modify the output signal pulse width.

3. A method according to claim 1 in which the input image signal is an 8-bit signal.

4. A digital pulse width modulator which comprises in combination:
   (i) a means to receive a multiple bit input image signal from an image signal generating means;
   (ii) a means to separate from the input image signal at least one bit including the most insignificant bit;
   (iii) a signal generator means including a counter means controlling the width of the pulse generated by the signal generator in response to the value of the remainder of the input image signal after separation of at least one bit;
   (iv) a clock means controlling the counter means; and
   (v) a delay means which receives one of the separated bits from the input image signal and which extends the width of the pulse generated by the signal generator in response to the value of the second separated bit.

5. A digital pulse width modulation which comprises in combination:
   (i) a means to receive a multiple bit input image signal from an image signal generating means;
   (ii) a means to separate and discard from the input image signal a first bit consisting of the most insignificant bit;
   (iii) a means to separate from the input image signal a second bit consisting of the least significant bit int the remaining signal;
   (iv) a signal generator means including a counter means controlling the width of the pulse generated by the signal generator in response to the value of the input image signal remainder of the input image signal, after separation of the two bits;
   (v) a clock means controlling the counter means; and
   (vi) a delay means which receives the first separated bit from the input image signal and which extends the length of the pulse generated by the signal generator in response to the value of the second separated bit.

6. A digital pulse width modulator according to claim 4 wherein the input image signal is an 8-bit signal.

7. A digital pulse width modulator according to claim 5 wherein the input image signal is an 8-bit signal.

8. An apparatus for generating a printed image containing at least 63 grey scale levels comprising in combination:
- (a) an image input signal generating means which provides multiple bit input image signal comprising at least 8 bits and corresponding to an image to be printed;
- (b) means to separate at least one least significant bit from the input image signal;
- (c) a clock means substantially synchronized with a print engine pixel clock means; wherein the frequency of the clock means is a whole number multiple of the frequency of the pixel clock means having a value of $2^n$, wherein n is the number of bits remaining in the image signal after at least one bit has been separated from it;
- (d) a signal generating means including a counter means actuated by the clock means and which controls the width of the signal generator output pulse in response to the value of the input image signal;
- (e) a delay means receiving one of the separated bits in the image input signal which lengthens the signal generator output pulse in response to the value of the received separated bit to provide a pulse width modulated signal;
- (f) means to apply the pulse width modulated signal to a Raster scanning point engine for generating a series of successive scan lines, to cause the print engine to generate each scan line as a succession of printed segments the size of each of which is determined by the pulse width of the pulse width modulated signal, thereby to provide a variable density printed image comprising a plurality of printed segments corresponding to an image including a grey scale having at least 64 levels.

9. An apparatus according to claim 8 wherein the multiple bit input image signal comprises 8 bits.

10. An apparatus according to claim 8 wherein the separation means separates one least significant bit from the input image signal which bit is received by the delay means.

11. An apparatus according to claim 8 wherein the separat me separates two least significant bits; the most insignificant bit is discarded; and the remaining least significant bit is received by the delay means.

* * * * *